July 29, 1947.  F. B. COLLINSON  2,424,678
MACHINE FOR AND METHOD OF CUTTING SHAPED PIECES FROM SHEET MATERIAL
Filed Feb. 19, 1945   3 Sheets-Sheet 1
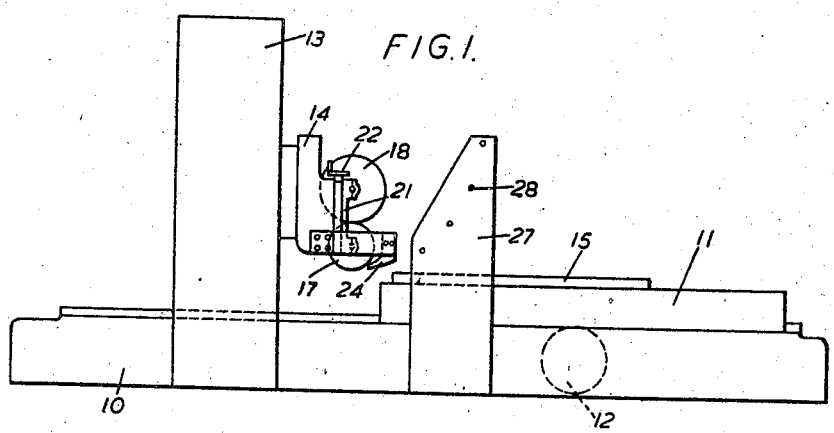
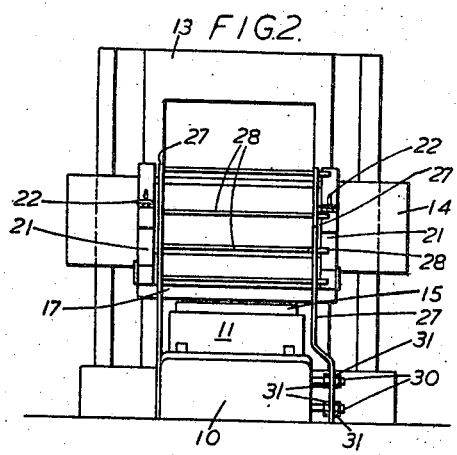
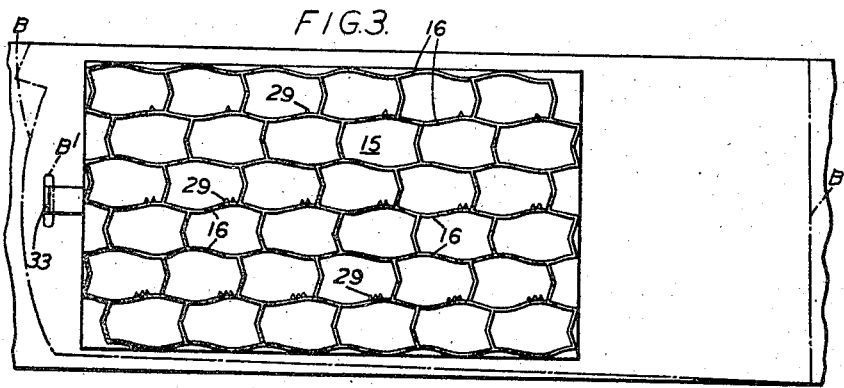
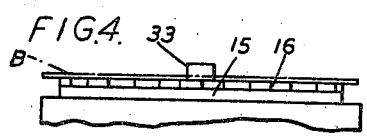
Frederick B. Collinson, Inventor
By [signature]
Attorney

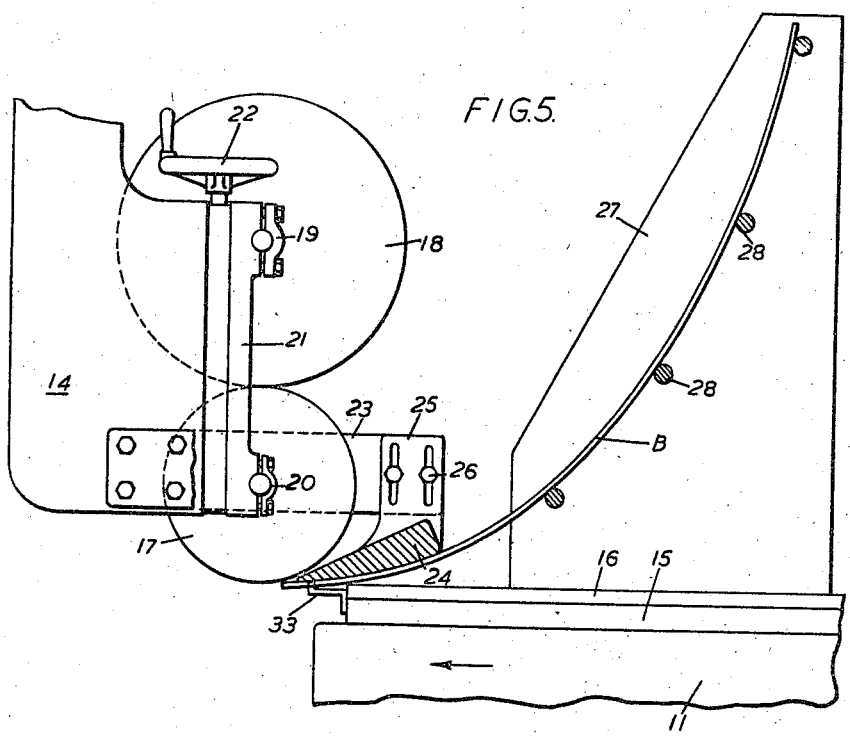
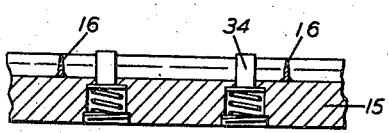
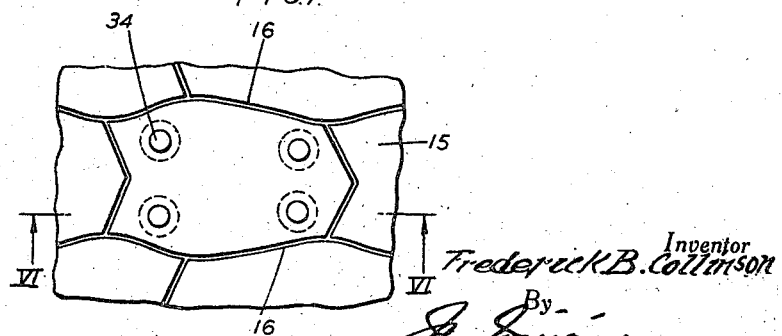

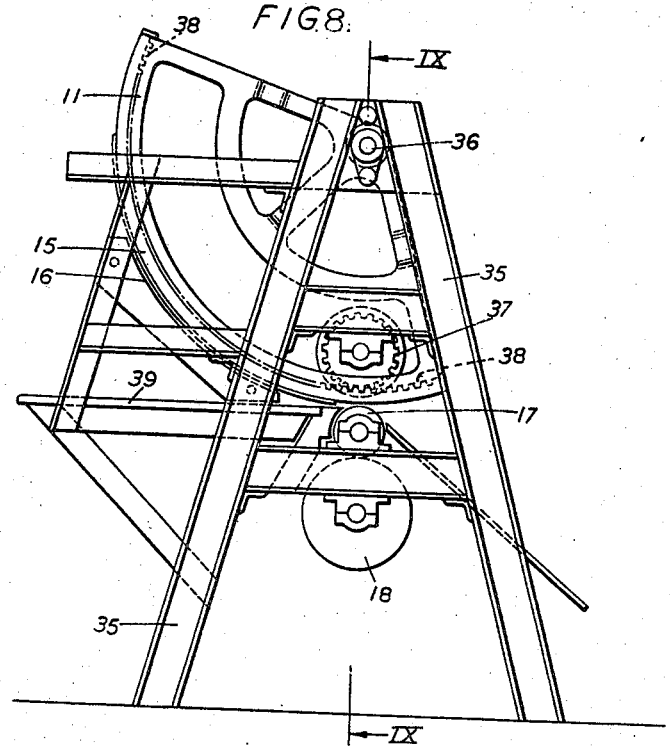
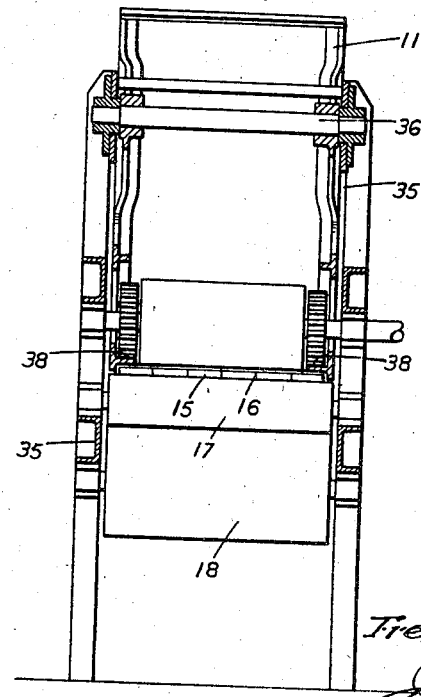

Patented July 29, 1947

2,424,678

UNITED STATES PATENT OFFICE 2,424,678

MACHINE FOR AND METHOD OF CUTTING SHAPED PIECES FROM SHEET MATERIAL

Frederick Baker Collinson, Litherland, Liverpool, England

Application February 19, 1945, Serial No. 578,708
In Great Britain February 15, 1944

12 Claims. (Cl. 164—19)

This invention is for improvements in or relating to machines for cutting "shaped pieces" from sheet material. The invention is particularly concerned with a machine for use in the production of what are known as cut soles, that is, soles for boots and shoes which are cut, at least approximately, to shape prior to being supplied to a boot repairer or manufacturer.

One method of cutting soles in use at the present time consists in placing a bend of leather, with a knife having the shape of the sole to be cut superimposed on it, in a press and operating the press so that the sole is stamped out of the bend. The knife, or another knife depending on the size of the sole to be cut, is moved from place to place on the bend for each cutting operation, i. e., the soles are cut out one at a time from the bend. This is a time-taking and laborious process but equally, or more objectionable, is the fact that the operator has to position the knife with great accuracy for each sole to be cut and on the accuracy of such positioning depends the amount of leather wasted between adjoining soles. A skilled operator can reduce this waste to a minimum but having regard to the shape of soles cut heretofore some wastage of leather between adjoining soles has been unavoidable, so as to ensure getting a full shaped sole.

One object of the present invention is to facilitate, and to eliminate the skill necessary in the cutting of soles and also to eliminate or at least substantially reduce the wastage of leather between adjoining soles.

According to the present invention there is provided a machine for cutting "shaped pieces" (e. g., leather soles) from sheet material comprising a cutting member having knives arranged to form a multiple pattern of the shapes to be cut, a pressing member and means for effecting relative traversing movement between the cutting member and the pressing member, one over the other, so as progressively to impress a sheet of material, fed or located between the said members, on to the pattern of knives and cut the shapes from the material.

According to a further feature of the present invention there is provided a machine for cutting "shaped pieces" from sheet material comprising a flat cutting table having knives on it arranged to form a multiple pattern of the shapes to be cut, a pressing member in juxtaposition to said knives and means for traversing the cutting table relatively to the pressing member so as progressively to impress a sheet of material, fed or located between the cutting table and the pressing member, on to the knives and cut the shapes from the material.

According to a still further feature of the present invention there is provided a planing machine adapted for the cutting of "shaped pieces" from sheet material comprising a cutting member mounted on the reciprocating platen or table of the machine and having knives arranged to form a multiple pattern of the shapes to be cut, and a pressing member mounted on the tool carrier of the machine and extending across the pattern of knives in juxtaposition thereto, the sheet material to be cut being fed between the cutting member and the pressing member.

Preferably the knives are arranged to form an interfitting (i. e., jig-saw) multiple pattern of the shapes (e. g., soles) to be cut. In cutting shapes such as soles from bends of leather it is of advantage if the bend is supported in an upwardly or downwardly curved condition for feeding to the machine because this serves to flatten out the natural "boatiness" or curvature of a bend during the cutting operation and ensures clean and accurate interfitting cutting of the soles to the required shape and size.

By making a pattern of jig-saw knives comprising closed figures of the shapes required individual soles are obtained from the bend and only so much of the bend need be used as is normally suitable for cutting certain soles. The part unused is not cut or damaged in any way and is available as heretofore for cutting into other shapes. The number, shape and size of the individual soles in the complete pattern can be predetermined so as to cover, with one traversing operation, only that part of the bend suitable to the particular shape being cut. It is desirable, therefore that the pattern of knives should begin and end so that no incisions are made in the leather beyond the limits of the pattern. Such incisions if made would reduce the value of the leather left in the bend after the sole pattern has been cut therefrom. It may be mentioned that it has previously been proposed to cut inner soles from duck or like sheet material by traversing a web of the material under a series of circular knives curved so that the required shape is imparted to the edges of the strips so obtained. These strips are subsequently severed transversely so as to provide individual soles, this being necessary because there are no transverse knives in the arrangement proposed. If this prior proposal were applied to the cutting of soles from leather there would be a considerable wastage at each end of the bend where sufficient leather would rarely be available to provide a complete sole and which in any case is not always suitable for cutting into the predetermined shape of sole.

The invention will be further described, by way of example, as applied to a sole cutting machine, with reference to the accompanying drawings. On the drawings—

Figure 1 is a diagrammatic side elevation of one embodiment of the invention and makes use of a planing machine of the well known kind used in the planing of metals, Figure 2 is an end elevation of Figure 1, Figure 3 is a plan view to a larger scale of the cutting table used in the embodiment of the invention shown in Figures 1 and 2.

Figure 4 is an end elevation of Figure 3,

Figure 5 is a detail elevation to a larger scale of part of the machine shown in Figures 1 and 2, Figure 6 is a fragmentary sectional elevation on the line VI—VI of Figure 7 of a means for ejecting the cut soles from between the knives, Figure 7 is a plan view of Figure 6, Figure 8 is a side elevation of a further embodiment of the invention and Figure 9 is a sectional elevation on the line IX—IX of Figure 8.

The embodiment of the invention shown in Figures 1 and 2 comprises a planing machine of the well known type having a bed plate 10, a table or platen 11 adapted to be traversed backwards and forwards in the usual way by a mechanism indicated diagrammatically at 12. The arch 13 of the machine carries the tool block 14.

For the purpose of the present invention the platen of the machine is adapted to carry a cutting member 15 having knives 16 arranged (see Figure 3) to form an interfitting (i. e., jig-saw) multiple pattern of soles. The tool block 14, instead of carrying a tool, supports a pressing member comprising a contact roller 17 (e. g., of hard wood), and a backing-up roller 18 both freely journalled in bearings 19 and 20 on a member 21. The member 21 can be adjusted vertically on the block 14 by means of a handwheel and screw mechanism 22 to compensate for wear of the contact roller. The tool block 14 also has a bracket 23 which supports an anvil roller or guide 24 immediately in front of the roller 17. The anvil roller or guide is also adjustable vertically and for this purpose is attached to the bracket by a slotted lug 25 and bolts 26. A support for the bend of leather B from which the soles are to be cut comprises upstanding side plates 27, secured to the bed plate 10 of the machine, and cross-bars 28. The cross-bars are arranged so that the bend of leather is supported bent sharply upwards from the roller 17 the underside of the anvil 24 is also curved to maintain the curved contour of the bend. The bend of leather is fed to the machine lengthwise as can be seen from Figure 3, in which the bend is indicated in chain lines, and by curving it across its width as just described "boatiness" (i. e., the natural curvature of a bend of leather) is flattened out and the required multiple jig-saw pattern cutting can be effected satisfactorily. In order to locate the bend laterally most economically, at least one of the side plates 27 is adjustable towards and away from the edge of the bend. For this purpose one of the plates 27 is shown on the drawings as being attached to the bed plates 10 by bolts 30 and nuts 31. The gauge plate 27 is set so that any strip at the side of the bend not wide enough for a row of soles can be used economically for cutting into, say, heels.

To locate the bend lengthwise relatively to the pattern of knives, it is provided at its forward end with a slot B1, the position of this slot being selected so that the pattern of soles is cut out of the required part of the bend and any leather left over can be turned to a useful purpose economically. The slot B1 is adapted to be engaged with a hooked member 33 on the forward end of the platen 11 and not only does the hooked member serve to position the bend but it also serves to ensure that it is fed positively into the machine. To eject the cut soles from between the knives, each sole pattern is provided with four spring plungers 34 (see Figures 6 and 7) housed in the base of the cutting member. As the soles are cut these spring plungers are compressed but once they are clear of the roller 17 they react and eject the soles.

In using the machine just described the appropriate cutting member is secured to the platen 11 (it will be appreciated that different cutting members are used according to the size or sizes and shape of the soles to be cut). The bend is then placed on the bars 28 and its forward end is inserted under the anvil 24 and attached to the hooked member 33 and the anvil or roller is adjusted to suit the thickness of the bend. This condition of affairs is shown clearly in Figure 5. The machine is then started and the cutting member 15 is fed slowly forward in the direction indicated by the arrow. As a result the bend of leather is also fed forwardly and at the same time is pressed on to the pattern of knives first by the anvil 24 and finally by the roller 17. Preferably the relative vertical positions of the knives and the anvil 24 and roller 17 are such that the leather is partly cut through on the anvil according to its substance (i. e., thickness) final severing of the soles from the bend being effected on the roller 17. The soles can be collected from the cutting member as the bend passes beyond the roller 17. In some cases, however, the platen, and in fact the machine as a whole, may be inclined so that the soles as they are ejected will fall automatically on to, say a conveyor belt by which they are carried away from the machine. Alternatively, for the same purpose, the machine may be arranged the opposite way up to that shown in Figures 1 and 2.

Figures 8 and 9 show a modification of the embodiment of the invention just described with reference to Figures 1 to 7 and where applicable like reference figures have been used to indicate like parts in the two machines. In the machine shown in Figures 8 and 9 the cutting member and its jig-saw sole-pattern of knives is of part-cylindrical form and is mounted on an arcuate carrier or platen 11 pivoted to a frame 35 at 36. The platen is moved about its pivot by driven pinions 37 which mesh with internal teeth 38 on the platen. The forward edge of a bend of leather is supported on a table 39 and the bend is "up-ended" and fed to the machine in a similar manner to that described with reference to Figures 1 and 2 of the drawings.

In some cases the platen may be driven by the pressing roller so as to traverse a bend of leather through the machine.

The operating mechanism of the machine may be arranged so that operators at either end thereof cannot start it independently of one another and thus to the danger of one of them. Preferably indicating lamps are provided so that one operator knows when the other is ready for a cutting operation to begin.

Conveniently the knives have notching elements which mark the soles, or at least the soles in each row, distinctively so as to indicate from which part of the bend a particular sole has been cut and, if required, other particulars. In Figure 3 notching elements 29, the size of which has been exaggerated in the drawing, are shown which by their number and position characteristically mark the soles. This marking of the soles greatly facilitates the sorting thereof.

The term "boatiness" as used herein defines a term well known and used in the industry and trade, and in that use means a bellying or concavity occurring in bends of leather due to the tanning thereof. Thus, it is impossible to obtain a flat bend of leather, and if the cutting proceeds without correcting this "boatiness" by locally flattening out the leather before used during cutting, the cut shapes removed from the knives and flattened out would not have the true shape of a sole.

I claim:

1. A machine of the planing type having a reciprocating platen and a tool carrier, adapted for the cutting of "shaped pieces" from sheet material, comprising a cutting member, having knives arranged to form a multiple pattern of the shapes to be cut, means securing said cutting member on the reciprocating platen of the machine, a pressing member extending across the pattern of knives in juxtaposition thereto, means supporting said pressing member on the tool carrier of the machine, the sheet material to be cut being fed between the cutting member and the pressing member, an anvil and means supporting said anvil immediately before the pressing member, preliminary cutting of the material taking place on said anvil.

2. A machine of the planing type having a reciprocating platen and a tool carrier, adapted for the cutting of "shaped pieces" from sheet material, comprising a cutting member, having knives arranged to form a multiple pattern of the shapes to be cut, means securing said cutting member on the reciprocating platen of the machine, a pressing member extending across the pattern of knives in juxtaposition thereto, means supporting said pressing member on the tool carrier of the machine, the sheet material to be cut being fed between the cutting member and the pressing member, means for supporting the sheet material for feeding to the machine, and an anvil immediately before the pressing member, said supporting means and the anvil being shaped so that the material is fed curved from the cutting member.

3. A machine of the planing type having a reciprocating platen and a tool carrier, adapted for the cutting of "shaped pieces" from sheet material, comprising a cutting member, having knives arranged to form a multiple pattern of the shapes to be cut, means securing said cutting member on the reciprocating platen of the machine, a pressing member extending across the pattern of knives in juxtaposition thereto, means supporting said pressing member on the tool carrier of the machine, the sheet material to be cut being fed between the cutting member and the pressing member, and an adjustable stop at one side of the machine, at least, for locating the material laterally with respect to the cutting member.

4. A method of cutting soles or the like from a bend of leather progressively by feeding the bend endwise to a cutting machine adapted, as the bend is fed to it, to cut out an interfitting jig-saw pattern of the soles, which comprises the step of feeding the bend to the machine bent across its width so as to eliminate "boatiness" of the bend at least at the zone being cut.

5. A method of cutting soles or the like from a bend of leather progressively by feeding the bend endwise to a cutting machine adapted, as the bend is fed to it, to cut out an interfitting jig-saw pattern of the soles, which comprises the step of feeding the bend to the machine bent across its width so as to eliminate "boatiness" of the bend at least at the zone being cut, and making a hole near one end of the bend of leather for engagement by the cutting member so as to locate the cutting zone and ensure a positive feed of the bend through the machine by movement of the cutting member.

6. A machine for cutting shaped pieces from leather bends possessing inherent boatiness, comprising a cutting member having knives to form a multiple pattern of the shapes to be cut, a pressing member, means for effecting relative traversing movement between the cutting member and the pressing member one over the other to progressively impress the leather fed between the said members on to the pattern of knives and cut the shaped pieces from the leather, and shaping and supporting means for eliminating boatiness in at least that portion of the leather reaching the cutting and pressing members.

7. A machine for cutting shaped pieces from leather bends possessing boatiness, comprising a flat cutting table having knives arranged to form a multiple pattern of the shapes to be cut, a pressing member in juxtaposition to said knives, means for traversing the cutting table relatively to the pressing member to progressively impress a bend of leather fed to and between the cutting table and the pressing member on to the knives and cut the shapes from the leather and means for eliminating boatiness in at least that portion of the leather reaching the cutting and pressing members, said means comprising supports which feed and direct the leather on a path curved from the said members on an axis transverse to the feeding direction of the leather.

8. A machine of the planing type having a reciprocating platen and tool carrier adapted for the cutting of shaped pieces from leather bends, comprising a cutting member having knives arranged to form a multiple pattern of the shapes to be cut, means securing said cutting member on the reciprocating platen of the machine, a pressing member extending across the pattern of knives in juxtaposition thereto, means supporting said pressing member on the tool carrier of the machine, and means for eliminating boatiness in at least that portion of the leather reaching the cutting and pressing members, said means comprising supports arranged so that the leather is fed to and curved from the cutting member about an axis transverse to the feeding direction of the leather.

9. A machine of the planing type, having a reciprocating platen and a tool carrier adapted for the cutting of shaped pieces from bends of leather possessing inherent boatiness as herein described, comprising a cutting member having knives arranged to form a multiple jig-saw pattern of the shapes to be cut, means securing said cutting member on the reciprocating platen of the machine, a freely rotatable pressing roller extending across the pattern of knives in juxtaposition thereto, means supporting said pressing roller from the tool carrier of the machine, and means for eliminating boatiness in at least that portion of the leather reaching the cutting and pressing member, said means comprising supports arranged so that the leather is fed to and curved from the cutting member about an axis transverse to the feeding direction of the leather.

10. A machine of the planing type having a reciprocating platen and a tool carrier adapted for the cutting of shaped pieces from sheet material comprising a cutting member having knives arranged to form a multiple jig-saw pattern on the shapes to be cut, means securing said cutting member on the reciprocating platen of the machine, a pressing member extending across the pattern of knives in juxtaposition thereto, means on the platen for interlocking engagement with the forward end of the leather bend to positively feed the leather through the machine by movement of the cutting member, and means for eliminating boatiness in at least that portion of the leather reaching the cutting and pressing members, said means comprising supports which feed and direct the leather on a path curved from said members on an axis transverse to the feeding direction of the leather.

11. A machine of the planing type having a reciprocating platen and a tool carrier adapted for the cutting of soles from leather bends comprising a cutting member, having knives arranged to form a multiple jig-saw pattern on the shapes to be cut, means securing said cutting member on the reciprocating platen of the machine, a pressing member extending across the pattern of knives in juxtaposition thereto, means for eliminating boatiness in at least that part of the leather reaching the cutting and pressing members, said means comprising supports so arranged that the leather is fed to and curved from the cutting member about an axis transverse to the feeding direction of the leather, and means for ejecting the cut shapes from the knives.

12. A method of cutting soles or the like from a bend of leather, possessing boatiness by progressively feeding the bend endwise to a cutting machine of the planing type acting as the bend is fed to it, to cut out an interfitting jig-saw pattern of the soles, comprising feeding the bend to the machine along a path curved from the cutting member of the machine on an axis transverse to the feeding direction of the material so as to eliminate boatiness of the bend at least at the zone being cut.

FREDERICK BAKER COLLINSON.

REFERENCES CITED

The following references are of record in the file of this patent:

UNITED STATES PATENTS

| Number | Name | Date |
|---|---|---|
| 1,938,725 | Seybold | Dec. 12, 1933 |
| 2,121,003 | Balfe | June 21, 1938 |
| 1,136,758 | Ballard | Apr. 20, 1915 |
| 420,452 | Hathaway | Feb. 4, 1890 |
| 2,168,401 | Evers | Aug. 8, 1939 |
| 2,217,060 | Korsen | Oct. 8, 1940 |
| 2,113,843 | Kavle | Apr. 12, 1938 |
| 613,397 | Sanson | Nov. 1, 1898 |
| 1,396,185 | Furber | Nov. 8, 1921 |
| 1,176,049 | Goldberg | Mar. 21, 1916 |
| 1,018,520 | Prime | Feb. 27, 1912 |
| 1,968,133 | Engel | July 31, 1934 |
| 650,652 | Pieper | May 29, 1900 |

FOREIGN PATENTS

| Number | Country | Date |
|---|---|---|
| 767 | Great Britain | Mar. 21, 1871 |